United States Patent Office 3,022,057
Patented Feb. 20, 1962

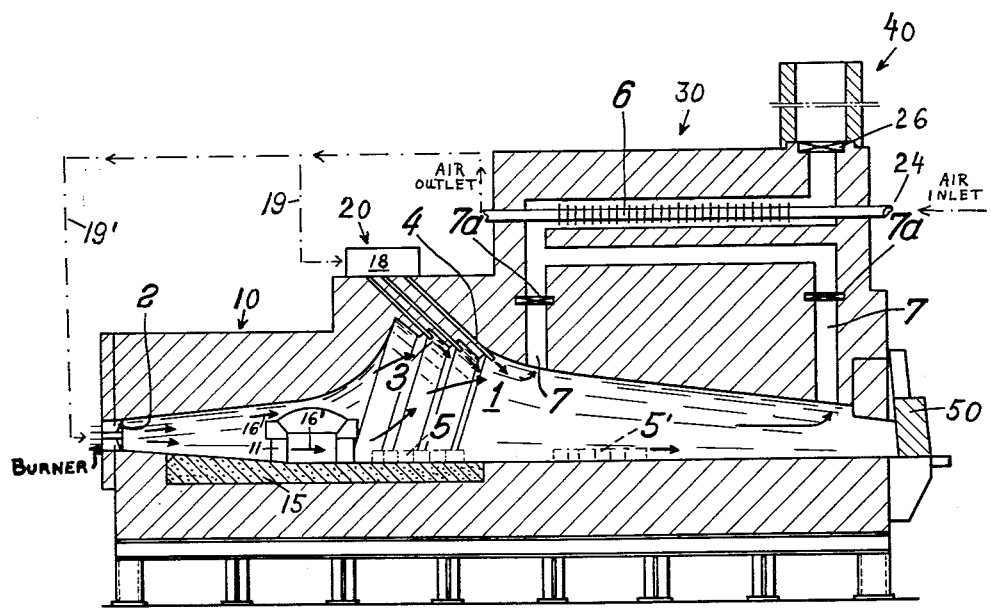

3,022,057
DIRECT-HEATING OVEN
Theodor Schmidt and Kurt Wilde, Essen, Germany, assignors to Indugas, Gesellschaft fur industrielle Gasverwendung m.b.H., Essen, Germany, a corporation of Germany
Filed Oct. 23, 1959, Ser. No. 848,349
Claims priority, application Germany Oct. 29, 1958
4 Claims. (Cl. 263—15)

Our present invention relates to a directly heated oven and, more particularly, to an oven adapted to be used in the scale-free heating and/or heat treatment of surface-oxidizable materials (e.g. steel objects), as well as to a process for carrying out such treatment.

In the heating of materials and particularly in the heat treating of metallic products susceptible to surface oxidation (i.e. scaling), several processes have heretofore been devised for avoiding the formation of such scale. These processes entail the use of a protective oxidation-inhibiting atmosphere; the indirect heating of the product by non-oxidizing media; and/or the separation of the combustion chamber from the object-containing chamber. Indirect-heating processes, owing to the low wear resistances of the materials used in the conduits for the protective and/or heating gases, have to be carried out at temperatures below 1050° C. and are generally inefficient, fuel utilizations of only about 20–30% being realized. In the more economical direct-heating processes, combustible gases are initially burned at higher temperatures with only a fraction of the necessary oxygen so that the fuel gas retains its reducing properties and acts as a protective agent; the combustion is then completed in one or more after-burner stages physically separated from the primary combustion stage, the heat thus produced being used in the regenerative preheating of the fuel or the combustion-promoting gas (i.e. air or oxygen). This recuperation process is, however, only about 30% effective because of the limited thermal capacity and strength of the heat-exchanger chambers. Another known process involves the interposition of a partition between the primary and secondary combustion areas, a portion of the heat resulting from the burning of incompletely oxidized primary-combustion gases passing through the partition to increase the temperature in the primary combustion chamber. Again only a small fraction of the available combustion heat can be utilized in this manner, even if pure oxygen or oxygen-enriched air is used in the process.

It is, therefore, an object of our present invention to provide a non-scaling, direct-heating oven adapted to utilize to the maximum the heat content of a fuel and to realize temperatures in excess of those attainable heretofore with similar equipment.

Another object of the invention is to provide a process and an apparatus for efficiently heat treating oxidizable articles with the use of only ordinary air as a combustion-promoting gas.

In accordance with a feature of our invention we provide, in an improved direct-heating oven, both primary and secondary combustion means for the two-stage burning of a fuel gas in a single combustion chamber containing the object to be heated, the secondary combustion means being so positioned downstream of the primary combustion means as to direct its heat mainly by radiation toward the location of the first combustion. The residual sensible heat of the secondary combustion gases may additionally be used to preheat the fuel gas and/or the air admitted into the oven.

A more specific feature of the invention resides in the provision of means whereby the hot, incompletely burned exhaust gas from the primary combustion passes over the object to be heated and serves as a protective atmosphere prior to being further burned in the secondary combustion stage; advantageously, the combustion products from this latter stage are so guided as to encounter the treated object only after having been cooled down to a non-oxidizing temperature whereby scale formation is prevented.

Another feature of our invention resides in the provision of means for reflecting the heat resulting from the secondary combustion stage onto the object as it passes the primary-combustion zone. Preferably, components of the combustible mixture (such as the secondary combustion air) are admitted into the secondary-combustion zone at spaced locations to minimize turbulence.

The above and other objects, features and advantages of our invention will become more readily apparent from the following description of a particular embodiment, reference being made to the accompanying drawing in which the sole figure is a longitudinal sectional view of a pusher-type oven for the heat-treatment of metal objects.

In the drawing we show an end-fired oven adapted to heat metal objects (e.g. sintered, forged and machined iron or steel products), comprising a primary combustion stage 10, a secondary combustion stage 20 and a regenerative heating stage 30. The oven is provided with a charging door 11 enabling the entry of bodies 5 to be heat treated. At one end of the inwardly widening, elongated combustion chamber 1 we provide a diffusion-type burner 2 to which there is supplied a fuel mixture of combustible gas and air containing only approximately half the oxygen necessary for complete oxidation of the fuel gas; this positioning of the burner prevents any return flow within this chamber. At its widest point, the combustion chamber 1 is provided with a vault-like, stepped roof 3 whose axis is slightly inclined with respect to the axis of chamber 1. A plurality of nozzles 4, terminating in chamber 1 in spaced relationship, serve to conduct air from a distributing chamber 18, having an inlet pipe schematically illustrated at 19 (dot-dash lines), into the combustion chamber 1 to define a secondary burning zone along the vault 3. This vault is so positioned and dimensioned that the radiant heat from the secondary combustion at the nozzles 4 is reflected toward the charge 5 which has just been admitted into the chamber 1 and is exposed at this instant to the flame of the fuel-gas/primary-air mixture from burner 2. The fully burned gases then enter either of two gas-outlet ducts 7, controlled by dampers 7a, and thence pass into the heat exchanger schematically shown at 6 for the regenerative heating of cool atmospheric air, aspirated by means not shown via pipe 24 through the heat exchanger, which after preheating enters the chamber 18 through the tube 19 or the burner 2 through tube 19'. The exhaust gas from chamber 1, stripped of its usable heat content, is passed out through chimney 40. The gas flow through the chimney is controlled by a damper 26.

In operation, the charge 5 is positioned on the floor of the oven chamber 1, preferably on an extremely heat-resistant portion 15 of that floor. The oxygen-unsaturated gas-air mixture from burner 2 is burned at the left-hand end of the furnace. The hot burning gases, moving slowly by reason of the diffusion characteristics of the burner, flow in the direction illustrated by the arrows 16 and 16', passing over the charge 5 and raising the temperature thereof. The gases resulting from the primary combustion at burner 2 then rise or are aspirated upwardly toward the nozzles 4 where the non-oxidized portion of the primary exhaust gas is burned to obtain maximum heat utilization from the fuel. The resulting heat is radiated downwardly to the charge 5, thereby further increasing the temperature thereof to, say, a range of 1100° to 1600° C. It will be apparent that after the furnace has been initially set in operation, the gases resulting from the primary combustion at the burner 2 will contact the previously heated charge 5 along the axis of the arches 3 toward which the secondary combustion heat is also radiated. Since only a portion of the fuel introduced at the firing end of the combustion chamber 1 is burned, the resulting primary exhaust gas carries a large carbonaceous fraction having reducing properties. This exhaust gas provides a protective atmosphere about the charge 5, preventing oxidation and, therefore, scaling at the high temperatures prevailing in the primary-combustion zone. From the secondary combustion stage 20 the waste gases pass to the regenerative heating unit 30 to energize the heat exchanger 6 by their residual sensible heat. The gas flow through the chamber 1 is so controlled that this secondary exhaust gas, which no longer has the protective reducing characteristics of the primary exhaust gas, contacts the heated objects only at a location 5' further along the path of the charge where the temperature of the gas has dropped well below the oxidation point e.g. to 800° C. in the case of iron; this is achieved by the gradual convergence of the chamber 1 in its right-hand part, and by suitable adjustment of the air-injection speed at nozzles 4. The charge is removed through a door 50.

The primary combustion mixture may be aspirated into the chamber 1 or may be introduced under slight pressure through the diffusion burner 2 by means known per se. Diffusion burners have the characteristic that their openings are so enlarged and their heads so expanded as to prevent swift gas currents and back currents from disturbing the gas flow in the chamber. Such back currents are to be avoided since they tend to cause agitation of the oxidizing gases developed in the zone of the vault section 3 and consequently would promote premature contact of the bodies 5 with these gases. By directing the nozzles 4 toward the rear of the oven chamber 1, the possibility of such oxidizing contact is greatly diminished; this permits a maximum heat utilization with a minimum of scaling or sooting-up of the heated bodies.

The oven and the process described hereinabove may also be used for batch-melting procedures, sintering processes, and kiln firing operations with minor changes in the structure of the furnace. These and other modifications, readily apparent to persons skilled in the art, are intended to be included within the spirit and scope of our invention except as further limited by the accompanying claims.

We claim:

1. In a heating furnace, in combination, an elongated, generally horizontal combustion chamber with an inlet end and an outlet end, the height of said chamber increasing progressively from said inlet end to an intermediate region and then decreasing toward said outlet end, first injector means at said inlet end for axially introducing an oxygen-unsaturated combustible gas mixture in an ignited state through said inlet end into said chamber, said chamber forming a substantially straight path for said mixture and for an accompanying charge to said outlet end, means for introducing said charge into said chamber at a location between said inlet end and said region, thereby exposing said charge to the flame of said mixture, second injector means positioned in said region at a substantial elevation above the path of said charge for admitting added oxygen into said chamber and causing a secondary combustion at said elevation of ignitable components of said mixture, and a roof for said chamber sloping at said region at an angle adapted to reflect radiant heat from said secondary combustion back toward said location while enabling the resulting combustion gases to pass along said roof toward said outlet end, said chamber being free from obstructions interfering with the reflections of said radiant heat to said location.

2. An oven according to claim 1 wherein said first injection means comprises a diffusion-type burner.

3. The combination according to claim 1 wherein said second injector means comprises inclined nozzle means directed generally toward said outlet end.

4. The combination according to claim 1, further comprising heat-exchange means energized by the residual heat of said combustion gases, and a source of air for at least one of said injector means preheated by said heat-exchange means.

References Cited in the file of this patent

UNITED STATES PATENTS 2,799,491     Rusciano               July 16, 1957

FOREIGN PATENTS 122,395     Great Britain           Apr. 14, 1924